United States Patent [19]

Haruta et al.

[11] Patent Number: 5,789,337
[45] Date of Patent: Aug. 4, 1998

[54] MATERIAL HAVING ULTRAFINE GOLD PARTICLES IMMOBILIZED THEREON AND METHOD FOR PRODUCTION THEREOF

[75] Inventors: Masatake Haruta; Mitsutaka Okumura; Koji Tanaka, all of Ikeda; Atsushi Ueda, Nishinomiya; Susumu Tsubota, Ashiya; Tetsuhiko Kobayashi, Ikeda, all of Japan

[73] Assignees: Agency of Industrial Science & Technology; Ministry of International Trade & Industry, both of Tokyo, Japan

[21] Appl. No.: 744,249

[22] Filed: Nov. 5, 1996

[30] Foreign Application Priority Data

Nov. 7, 1995 [JP] Japan .................. 7-314809

[51] Int. Cl.$^6$ .................. B01J 23/52; B01J 27/04
[52] U.S. Cl. .................. 502/344; 502/325; 502/330; 502/416; 502/216
[58] Field of Search .................. 502/344, 325, 502/330, 416, 216

[56] References Cited

U.S. PATENT DOCUMENTS

| 4,042,464 | 8/1977  | Blurton et al. .................. 204/1 T |
| 4,490,481 | 12/1984 | Boitiax et al. .................. 502/330 |
| 4,569,924 | 2/1986  | Ozin et al. .................. 502/184 |
| 4,659,686 | 4/1987  | Griffiths et al. .................. 502/183 |
| 4,698,324 | 10/1987 | Haruta et al. .................. 502/243 |
| 4,714,627 | 12/1987 | Puddephatt et al. .................. 427/53.1 |
| 4,839,327 | 6/1989  | Haruta et al. .................. 502/243 |
| 4,937,219 | 6/1990  | Haruta et al. .................. 502/174 |
| 5,051,394 | 9/1991  | Haruta et al. .................. 502/324 |
| 5,194,417 | 3/1993  | Smith et al. .................. 502/330 |
| 5,506,273 | 4/1996  | Haruta et al. .................. 518/713 |

FOREIGN PATENT DOCUMENTS

| 60-238148 | 11/1985 | Japan . |
| 5-34284   | 5/1993  | Japan . |

OTHER PUBLICATIONS

Chemical Abstracts (109:72971 CA) "Reaction of a supported gold catalyst for acetylene hydrochlorination". Nkosi et al., 1988 no month.

*Primary Examiner*—Walter D. Griffin
*Assistant Examiner*—Nadine Preisch
*Attorney, Agent, or Firm*—Oblon, Spivak, McClelland, Maier & Neustadt, P.C.

[57] ABSTRACT

A material having ultrafine gold particles immobilized thereon consists essentially of at least one support selected from the group consisting of metal oxides, metal sulfides, and carbonaceous substances and ultrafine gold particles having a maximum particle diameter of 250 angstroms and deposited on the support with strong interaction. The material exhibits high activity as a catalyst for the oxidation of carbon monoxide to carbon dioxide. It is produced by causing a vaporized organic gold complex to contact at least one support selected from the group consisting of metal oxides, metal sulfides, and carbonaceous substances in an atmosphere of reduced pressure thereby inducing adsorption of the vapor of organic gold complex on the support and then heating the product of the adsorption to a temperature in the range of 100°–700° C.

11 Claims, 4 Drawing Sheets

MATERIAL HAVING ULTRAFINE GOLD PARTICLES IMMOBILIZED THEREON AND METHOD FOR PRODUCTION THEREOF

BACKGROUND OF THE INVENTION

1. Field of the Invention

This invention relates to a material having ultrafine gold particles immobilized thereon and a method for the production thereof. It further relates to an oxidizing catalyst which is formed of the material.

2. Prior Art Statement

It is known that ultrafine gold particles having particle diameters of not more than about 0.1 μm exhibit peculiar physical and chemical properties different from those of ordinary large gold particles ("Ultrafine Particles," published by Agne Press Center, 1986).

The ultrafine particles, however, are difficult to handle because they have a large surface energy and are very liable to cohere. Particularly, ultrafine particles of gold exhibit strong cohesion as compared with ultrafine particles of other noble metals such as Pt and Pd, and are highly likely to agglomerate. Thus, the ultrafine gold particles which might exhibit the unique physical and chemical properties mentioned above are extremely difficult to obtain.

It has been heretofore tried, therefore, to immobilize ultrafine gold particles by depositing them in a uniformly dispersed state on a support. For example, a method for obtaining a composite material having a gold compound dispersed in a metal oxide by preparing an aqueous solution containing a mixture of a water-soluble compound of manganese, iron, cobalt, nickel, or copper with a gold compound and subjecting the solution to coprecipitation (Japanese Patent Public Disclosure Sho 60(1985)-238148) and a method for obtaining a gold-deposited composite material by a deposition-precipitation method (Japanese Patent Publication Hei 5(1993)-34284) have been reported.

Some of the inventors named in this patent application and other researchers pursued studies regarding the immobilization of ultrafine gold particles. The inventions that issued from this work have been granted U.S. Pat. No. 4,698,324, No. 4,839,327, No. 4,937,219, No. 5,051,394, and No. 5,506,273. Another U.S. patent application Ser No., 08/547,812, is still pending.

However, the methods of these inventions have difficulty in depositing ultrafine gold particles on a specific group of supports, because an appreciably large difference in the electrostatic or chemical interaction occurs between the support and the gold complex ion (such as, for example, $AuCl_4^-$), depending on the nature (acidic or basic) of the surface of the support in the aqueous solution, for example. It is difficult to deposit ultrafine gold particles on such a metal oxide as, for example, silica which exhibits strong surface acidity in an aqueous solution. This deposition is particularly difficult when the ultrafine gold particles should have particle diameters of not more than 2 nm.

A material having ultrafine gold particles immobilized thereon which consists of ultrafine gold particles and a support carrying the ultrafine gold particles thereon can be practically used as a catalyst, for example. For the material to exhibit excellent properties as a catalyst, it is necessary that the gold be in the state of ultrafine particles and that the ultrafine gold particles be deposited in a uniformly dispersed state on the support.

The present inventors made a study with the object of obtaining a material having such ultrafine gold particles immobilized thereon. The present invention was accomplished as a result.

SUMMARY OF THE INVENTION

To achieve the object mentioned above, this invention provides a material having ultrafine gold particles immobilized thereon, which consists essentially of at least one support selected from the group consisting of metal oxides, metal sulfides, and carbonaceous substances and ultrafine gold particles having a maximum particle diameter of 250 angstroms and deposited on the support with strong interaction, a method for the production of a material having ultrafine gold particles immobilized thereon, which consists essentially of causing a vaporized organic gold complex to contact at least one support selected from the group consisting of metal oxides, metal sulfides, and carbonaceous substances in an atmosphere of reduced pressure thereby inducing adsorption of the vapor of organic gold complex on the support and then maintaining the product of the adsorption at a temperature in the range of 100°–700° C., and a catalyst and a sensor which are each formed of the material having the ultrafine gold particles immobilized thereon.

DESCRIPTION OF THE PREFERRED EMBODIMENTS

Figure 1:
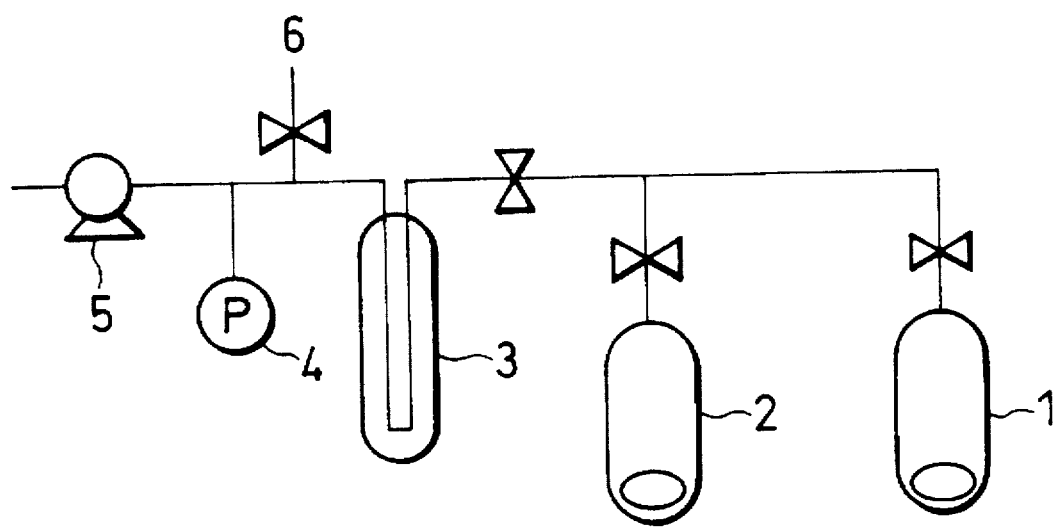
FIG. 1 is a reaction apparatus used in preparing the material samples of this invention.

The material having ultrafine gold particles immobilized thereon according to this invention consists of a support formed of at least one member selected from the group consisting of metal oxides, metal sulfides, and carbonaceous substances and ultrafine gold particles having particle diameters of not more than 250 angstroms deposited on the support.

The particle diameters of the ultrafine gold particles of this invention are usually not more than 250 angstroms. The lower limit of the particle diameters can be determined from the point of view of the kind of the supports and the use intended for the product, for example. This invention allows the ultrafine gold particles having diameters of the order of about 10 angstroms to be deposited on the support.

The metal oxides are not particularly limited. For example, the oxide of at least one member selected from the group consisting of magnesium, aluminum, silicon, titanium, vanadium, chromium, manganese, iron, cobalt, nickel, copper, zinc, gallium, germanium, strontium, yttrium, zirconium, niobium, molybdenum, technetium, ruthenium, rhodium, palladium, silver, cadmium, indium, tin, antimony, barium, lanthanum, hafnium, thallium, tungsten, rhenium, osmium, iridium, and platinum can be used. Among these metal oxides, manganese oxide, nickel oxide, alumina, silica, and titanium dioxide prove particularly favorable from the practical point of view.

As the metal sulfide, the sulfide of at least one member selected from the group consisting of molybdenum, tungsten, iron, nickel, cobalt, platinum, vanadium, chromium, and manganese can be used. Among these metal sulfides, molybdenum sulfide, tungsten sulfide, iron sulfide, nickel sulfide, and cobalt sulfide prove particularly advantageous.

As the carbonaceous substance, at least one member selected from the group consisting of active carbon, active carbon fibers, and graphite can be used. Among these carbonaceous substances, active carbon proves particularly advantageous.

The amount of the ultrafine gold particles deposited on the support is in the range of 0.01–30% by weight, based on the amount of the support. If the amount of the ultrafine gold particles is unduly small, the effect of immobilizing the ultrafine gold particles in the material will not be fully exhibited. Conversely, if this amount is unduly large, the produced material will be too expensive to be practicable. The amount is practically in the range of 0.01–10% by weight.

The shape of the support is not particularly limited. The support can be used in various shapes such as, for example, powder, granule, and plate. In addition, a metal oxide support can be used as fixed on a foamed body, honeycomb, pellet or other such carrier made of a metal or a ceramic such as alumina, silica, titania or magnesia.

The material having ultrafine gold particles immobilized thereon according to this invention can be obtained by causing a vaporized organic gold complex to contact at least one support selected from the group consisting of metal oxides, metal sulfides, and carbonaceous substances in an atmosphere of reduced pressure thereby inducing adsorption of the vaporized organic gold complex on the support and then heating the product of the adsorption at a temperature in the range of 100°–700° C.

The organic gold complex is only required to possess volatility and is not particularly limited in any other respect. The organic gold complexes which are effectively usable herein include $(CH_3)_2Au(CH_3COCHCOCH_3)$, $(CH_3)_2Au(CF_3COCHCOCH_3)$, $(CH_3)_2Au(CF_3COCHCOCF_3)$, $(C_2H_5)_2Au(CH_3COCHCOCH_3)$, $(CH_3)_2Au(C_6H_5COCHCOCF_3)$, $CH_3CH_2AuP(CH_3)_3$, and $CH_3AuP(CH_3)_3$.

The support can be any of the substances for immobilizing ultrafine gold particles thereon as described above.

Among the organic gold complexes cited above, $(CH_3)_2Au(CH_3COCHCOCH_3)$, $(CH_3)_2Au(CF_3COCHCOCF_3)$, and $(CH_3)_2Au(CF_3COOHCOCH_3)$, prove particularly advantageous.

The metal oxides which are effectively usable in this invention include carbonates, hydroxides, and other salts of the metals of the metal oxides cited above which, when oxidized, are ultimately converted into metal oxides.

The support may be heat-treated at about 200° C. to remove the moisture present on the surface thereof before it is put to use.

The vaporization of the organic gold complex can be attained by heating. Although the temperature of this heating must be selected to avoid inducing sudden vaporization and adsorption or decomposition, it is not particularly limited in any other respect. Generally, it is in the range of 0°–90° C. Further, the gasification can be performed under reduced pressure. The reduced pressure may be generally selected in the approximate range of $1\times10^{-4}$–$2\times10^{-3}$ Torr.

The vaporized organic gold complex is adsorbed on the support under a reduced pressure. The expression "under a reduced pressure" as used with respect to this invention generally refers to a pressure falling in the approximate range of $1\times10^{-4}$–200 Torrs, though it needs only be below atmospheric pressure. Though the amount of the organic gold complex introduced varies with the kind of the gold complex used, it may be suitably adjusted so that the amount thereof to be ultimately deposited on the support falls in the range specified above. The pressure may be adjusted by the use of a conventional vacuum pump.

Then, the support on which the organic gold complex has been adsorbed is heated in air to a temperature generally in the approximate range of 100°–700° C., preferably 300°–500° C. In consequence of this heat treatment, the organic component in the organic gold complex is decomposed and oxidized and, at the same time, the organic gold complex is reduced to gold and deposited in the form of ultrafine gold particles on the support and immobilized thereon. The heating period is generally sufficient in the approximate range of 1–24 hours, though it may be suitably fixed depending on the amount of the organic gold complex to be deposited and the temperature, for example.

The material having immobilized ultrafine gold particles thereon according to this invention is obtained as described above. The method for the production of the material of this invention allows the support to be heated for the sake of surface treatment generally in the approximate range of 100°–700° C. prior to the adsorption of the organic gold complex. This surface treatment may be carried out in the atmosphere of an oxidizing gas or a reducing gas. As a result, it is made easy to control the amount of lattice defects and the electronic state of the surface and to control more precisely the particle diameters of gold and the amount of gold deposited.

The oxidizing gas may be any of the oxidizing gases known in the art such as, for example, oxygen gas and nitrogen monoxide gas. The reducing gas may be any of the reducing gases known in the art such as, for example, hydrogen gas and carbon monoxide gas.

The surface treatment by the use of such a gas as mentioned above can be carried out, for example, as follows.

(I) First method:

First, the support is left standing under a reduced pressure for 30 minutes in a reaction apparatus, which is evaucated to $10^{-3}$ Torr, and maintained at 200° C. for four hours to remove water present on the surface thereof. Further, a reducing gas such as hydrogen gas is introduced under a pressure of 10–200 Torrs at a temperature in the range of 200°–600° C. to the support in the reaction apparatus to reduce the surface of the support for a period in the range of 1–24 hours. The reaction apparatus is evacuated and then cooled to room temperature. Otherwise, it is cooled to room temperature and then evacuated. Thereafter, the organic gold complex is evaporated under a reduced pressure and adsorbed on the support. After the elapse of a prescribed time, the support having the vapor of organic gold complex adsorbed thereon is calcined in air at a temperature in the range of 100°–700° C. to induce deposition and immobilization of ultrafine gold particles on the support.

(II) Second method:

First, the support is left standing under a reduced pressure for 30 minutes in a reaction apparatus, which is evacuated to $10^{-3}$ Torr, and maintained at 200° C. for four hours to remove the water present on the surface thereof. Further, an oxidizing gas such as oxygen gas is introduced under a pressure of 10–200 Torrs at a temperature in the range of 200°–700° C. to the support in the reaction apparatus to oxidize the surface of the support for a period in the range of 1–24 hours. The reaction apparatus is evacuated and then cooled to room temperature. Otherwise, it is cooled to room temperature and then evacuated. Thereafter, the organic gold complex is evaporated under a reduced pressure and adsorbed on the support. After the elapse of a prescribed time, the support having the vapor of organic gold complex adsorbed thereon is calcined in air at a temperature in the range of 100°–700° C. to induce deposition and immobilization of ultrafine gold particles on the support.

(III) Third method:

First, the support is left standing under a reduced pressure for 30 minutes in a reaction apparatus, which is evacuated to $10^{-3}$ Torr, and maintained at 200° C. for four hours to remove water present on the surface thereof. Further, for the sake of surface treatment, it is maintained at a temperature in the range of 200°–700° C. for a period in the range of 1–24 hours. The reaction apparatus is evacuated and cooled to room temperature. Then, the organic gold complex is evaporated under a reduced pressure and adsorbed on the support. After the elapse of a prescribed time, the support having the vapor of organic gold complex adsorbed thereon is calcined in air at a temperature in the range of 100°–700° C. to induce deposition and immobilization of ultrafine gold particles on the support.

Among the materials having ultrafine gold particles immobilized thereon according to this invention, the materials which consist essentially of a support formed of the oxide of at least one member selected from the group consisting of aluminum, silicon, titanium, vanadium, gallium, germanium, molybdenum, indium, tin, antimony, lanthanum, tungsten, and bismuth and ultrafine gold particles having a maximum particle diameter of 250 angstroms and deposited on the support with strong interaction are useful as oxidizing catalysts.

The materials which consist essentially of a support formed of the oxide of at least one member selected from the group consisting of aluminum, silicon, titanium, vanadium, and chromium and ultrafine gold particles having a maximum particle diameter of 250 angstroms and deposited on the support with strong interaction are particularly useful as reducing catalysts.

Further, the materials which consist essentially of a support formed of at least one member selected from the group consisting of oxides and sulfides of nickel, aluminum, manganese, silicon, titanium, vanadium, and chromium, and carbonaceous substances and ultrafine gold particles having a maximum particle diameter of 250 angstroms and deposited on the support with strong interaction are particularly useful as flammable gas sensor elements.

In all these applications, the amount of the ultrafine gold particles deposited on the support is in the range of 0.01–30% by weight, preferably 0.01–10% by weight.

By the production method according to this invention, ultrafine gold particles having a maximum particle diameter of 250 angstroms can be uniformly immobilized on a metal oxide, for example, and can be deposited even on metal oxides on which deposition has been impossible by the conventional methods.

The material having ultrafine gold particles immobilized thereon which is obtained by the method of this invention is thought to have the ultrafine gold particles immobilized in a specific structure on the support and, therefore, is enabled to exhibit an outstanding catalytic capacity in various applications.

For example, the material having ultrafine gold particles immobilized thereon which is produced by the method of this invention, when used in the oxidation of carbon monoxide, hydrogen, etc., exhibits a very high activity as compared with a material having ultrafine gold particles immobilized thereon obtained by the conventional methods. It is also useful as a catalyst for reducing such nitrogen oxides as NO and $NO_2$ with reductants such as hydrogen and carbon monoxide. It is further useful as a flammable gas sensor element for carbon monoxide, methanol, and hydrocarbons.

Now, this invention will be described in detail below with reference to working examples.

The reaction apparatus used in the working examples is illustrated in FIG. 1.

In the diagram, 1 represents a reaction vessel, 2 a storage vessel for an organic gold complex, 3 a liquefied nitrogen trap, 4 a pressure gauge, 5 a rotary pump, and 6 a gas inlet orifice. The pipes interconnecting these components of the reaction apparatus were made of Pyrex glass. The highest vacuum degree that was attainable in this reaction apparatus was about 10–3 Torr.

EXAMPLE 1

In the reaction vessel 1, 500 mg of nickel oxide (NiO) powder was placed and left standing for 30 minutes so as to fix the state of reduced pressure (in the neighborhood of 10–3 Torr by means of the rotary vacuum oil pump 5) in the reaction apparatus. Subsequently, the reaction vessel was heated under a reduced pressure to 200° C. and maintained at this temperature for four hours to remove water and other contaminants adsorbed on the surface of the powder. Then, oxygen gas of 20 Torrs was introduced through the orifice 6 into the reaction vessel and the powder was oxidized at 200° C. for 30 minutes. The reaction apparatus was evacuated to remove the oxygen gas and then left cooling to room temperature for one hour.

Then, the storage vessel 2 was charged with 40 mg of $Me_2Au(acac)$ and evacuated until the inner pressure thereof was fixed. Subsequently, the storage vessel and the reaction vessel were isolated from the remainder of the reaction apparatus by closing valves. The two vessels were kept at 33° C. by maintaining the pipe connecting them at 30°–40° C. The pipes of the apparatus were shielded from the ambient light. The reaction apparatus was kept in this state for 24 hours to have the $Me_2Au(acac)$ diffused and adsorbed on the nickel oxide powder. The reaction vessel was opposed to the atmosphere and the content thereof was heated in air to 300° C. and maintained at this temperature for four hours to decompose and reduce the gold complex on the nickel oxide and consequently fix ultrafine gold particles on the support of nickel oxide.

EXAMPLE 2

The fixation of ultrafine gold particles was effected by following the procedure of Example 1 except that 500 mg of manganese dioxide ($MnO_2$) powder was placed in the reaction vessel.

EXAMPLE 3

The fixation of ultrafine gold particles was effected by following the procedure of Example 1 except that 500 mg of alumina ($Al_2O_3$) powder was placed instead in the reaction vessel.

EXAMPLE 4

The fixation of ultrafine gold particles was effected by following the procedure of Example 1 except that 500 mg of silica gel ($SiO_2$) powder 310 $m^2/g$ in specific surface area and 500 mg of silica 180 $m^2/g$ in specific surface area were respectively placed in the reaction vessel.

EXAMPLE 5

The fixation of ultrafine gold particles was effected by following the procedure of Example 1 except that 500 mg of anatase type titania ($TiO_2$) powder was placed in the reaction vessel.

EXAMPLE 6

The fixation of ultrafine gold particles was effected by following the procedure of Example 1 except that 500 mg of amorphous titanium dioxide ($TiO_2$) powder was placed in the reaction vessel.

EXAMPLE 7

In the reaction vessel 1, 500 mg of amorphous titanium dioxide ($TiO_2$) powder was placed and left standing for 30 minutes so as to fix the state of reduced pressure in the reaction apparatus. Subsequently, the reaction vessel was heated under a reduced pressure to 200° C. and maintained at this temperature for four hours to remove water and other contaminants adsorbed on the surface of the powder. Then, hydrogen gas of 20 Torrs was introduced through the orifice 6 into the reaction vessel and the powder was reduced at 450° C. for 30 minutes. The reaction vessel was evacuated to remove the hydrogen gas and then left cooling to room temperature for one hour.

Then, the storage vessel 2 was charged with 40 mg of $Me_2Au(acac)$ and evacuated until the inner pressure thereof was fixed. Subsequently, the storage vessel and the reaction vessel were isolated from the remainder of the reaction apparatus by closing valves. The two vessels were kept at 33° C. by maintaining the pipe between them at 30°–40° C. The pipes of the apparatus were shielded from the ambient light. The reaction apparatus was kept in this state for 24 hours to have the $Me_2Au(acac)$ diffused and adsorbed on the titanium dioxide powder. The reaction vessel was opened to the atmosphere and the content thereof was heated in air to 300° C. and maintained at this temperature for four hours to decompose and reduce the gold complex on the titanium dioxide and consequently fix ultrafine gold particles on the support of titanium oxide.

EXAMPLE 8

In the reaction vessel 1, 500 mg of amorphous titanium dioxide ($TiO_2$) powder was placed and left standing for 30 minutes so as to fix the state of reduced pressure in the reaction apparatus. Subsequently, the reaction chamber was heated under a reduced pressure to 200° C. and maintained at this temperature for four hours to remove water and other contaminants adsorbed on the surface of the powder. Then, the powder in the reaction chamber was maintained at 450° C. for 30 minutes. It was left cooling to room temperature for one hour.

Thereafter, the fixation of ultrafine gold particles on the titanium dioxide was effected by following the procedure of Example 7.

EXAMPLE 9

The metal oxides having ultrafine gold particles deposited thereon were tested for activity to oxidize carbon monoxide as follows. The results are shown in FIG. 2.

(1) A column was packed with 100 mg of the nickel oxide having gold deposited thereon produced in Example 1 and a mixed gas having 1% by volume of carbon monoxide in air was passed through the column at a flow rate of 33 ml/minute to test the gold-nickel oxide composite for activity to oxidize carbon monoxide.

Figure 2:
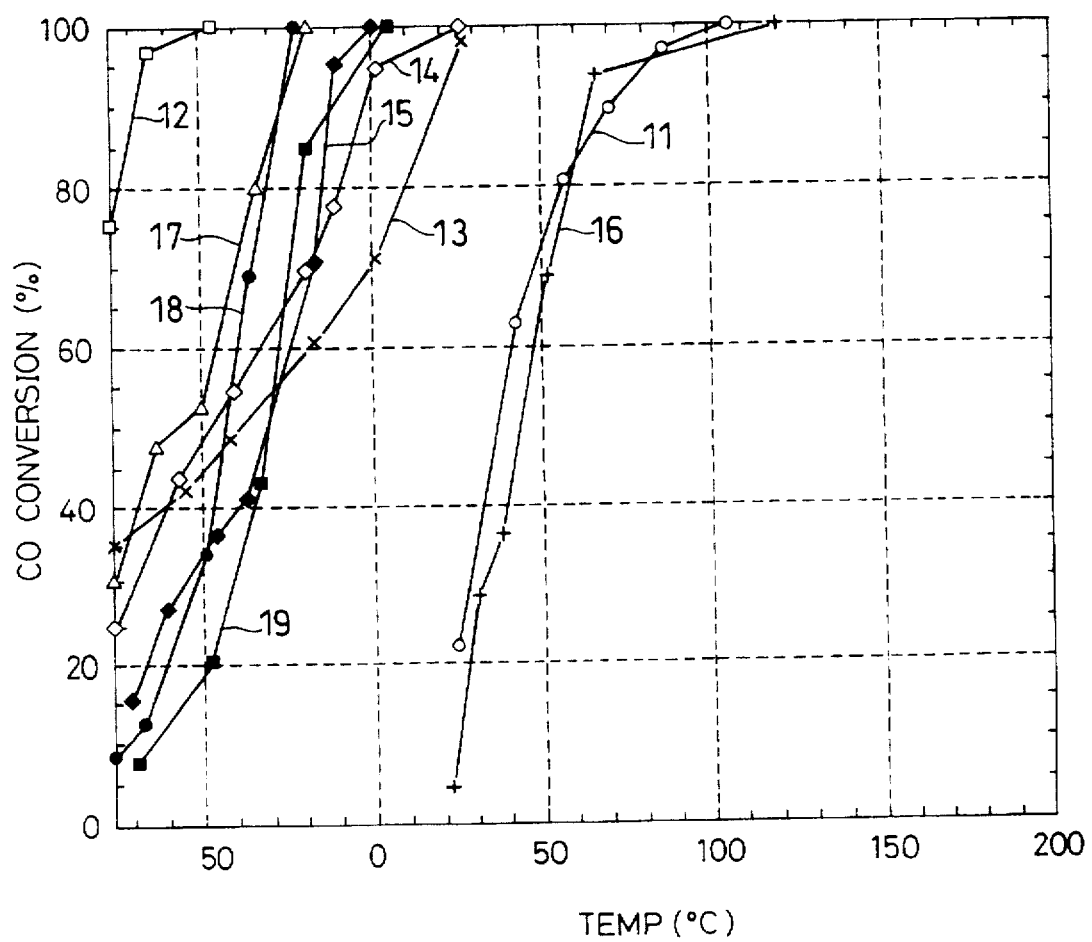
FIG. 2 is a graph showing the results of catalytic activity tests for the oxidation of carbon monoxide over the metal oxide having deposited thereon ultrafine gold particles according to this invention as shown in Example 9.

The results are shown by the line 11 in FIG. 2.

The gold-nickel oxide composite was consequently found to be capable of oxidizing 50% of the carbon monoxide into carbon dioxide at 35° C.

(2) A column was packed with 100 mg of the manganese dioxide having gold deposited thereon produced in Example 2 and a mixed gas having 1% by volume of carbon monoxide in air was passed through the column at a flow rate of 33 ml/minute to test the gold-manganese dioxide composite for activity to oxidize carbon monoxide.

The results are shown by the line 12 in FIG. 2.

The composite was consequently found to be capable of oxidizing 75% of the carbon monoxide into carbon dioxide at −75° C.

(3) A column was packed with 100 mg of the alumina having gold deposited thereon produced in Example 3 and a mixed gas having 1% by volume of carbon monoxide in air was passed through the column at a flow rate of 33 ml/minute to test the gold-alumina composite for activity to oxidize carbon monoxide.

The results are shown by the line 13 in FIG. 2.

The composite was consequently found to be capable of oxidizing 50% of the carbon monoxide into carbon dioxide at −38° C.

(4) A column was packed with 100 mg of silica (specific surface area 180 $m^2/g$) having gold deposited thereon produced in accordance with the method of this invention and a mixed gas having 1% by volume of carbon monoxide in air was passed through the column at a flow rate of 33 ml/minute to test the gold-silica composite for activity to oxidize carbon monoxide.

The results are shown by the line 14 in FIG. 2.

The composite was consequently found to be capable of oxidizing 50% of the carbon monoxide into carbon dioxide at −24° C.

(5) A column was packed with 100 mg of the silica gel having gold deposited thereon produced in Example 4 and a mixed gas having 1% by volume of carbon monoxide in air was passed through the column at a flow rate of 33 ml/minute to test the gold-silica gel composite for activity to oxidize carbon monoxide.

The results are shown by the line 15 in FIG. 2.

The composite was consequently found to be capable of oxidizing 50% of the carbon monoxide into carbon dioxide at −30° C.

(6) A column was packed with 100 mg of the anatase type titania having gold deposited thereon produced in Example 5 and a mixed gas having 1% by volume of carbon monoxide in air was passed through the column at a flow rate of 33 ml/minute to test the gold-anatase type titania composite for activity to oxidize carbon monoxide.

The results are shown by the line 16 in FIG. 2.

The composite was consequently found to be capable of oxidizing 50% of the carbon monoxide into carbon dioxide at 34° C.

(7) A column was packed with 100 mg of oxygen-treated amorphous titanium dioxide having gold deposited thereon and a mixed gas having 1% by volume of carbon monoxide in air was passed through the column at a flow rate of 33 ml/minute to test the gold-amorphous titanium dioxide composite for activity to oxidize carbon monoxide.

The results are shown by the line 17 in FIG. 2.

The composite was consequently found to be capable of oxidizing 50% of the carbon monoxide into carbon dioxide at –46° C.

(8) A column was packed with 100 mg of hydrogen-treated amorphous titanium dioxide having gold deposited thereon and a mixed gas having 1% by volume of carbon monoxide in air was passed through the column at a flow rate of 33 ml/minute to test the gold-amorphous titanium dioxide composite for activity to oxidize carbon monoxide.

The results are shown by the line 18 in FIG. 2.

The composite was consequently found to be capable of oxidizing 50% of the carbon monoxide into carbon dioxide at –42° C.

(9) A column was packed with 100 mg of vacuum heat-treated amorphous titanium dioxide having gold deposited thereon and a mixed gas having 1% by volume of carbon monoxide in air was passed through the column at a flow rate of 33 ml/minute to test the gold-amorphous titanium dioxide composite for activity to oxidize carbon monoxide.

The results are shown by the line 19 in FIG. 2.

The composite was consequently found to be capable of oxidizing 50% of the carbon monoxide into carbon dioxide at –31° C.

This Example 9 shows that the materials having ultrafine gold particles immobilized thereon according to this invention each exhibited outstanding activity as a catalyst for the oxidation of carbon monoxide.

EXAMPLE 10

The material having ultrafine gold particles deposited on titanium dioxide obtained in Example 6 was observed under a transmission electron microscope. The electron micrograph consequently obtained at 1,200,000 magnifications is shown in FIG. 3.

Figure 3:
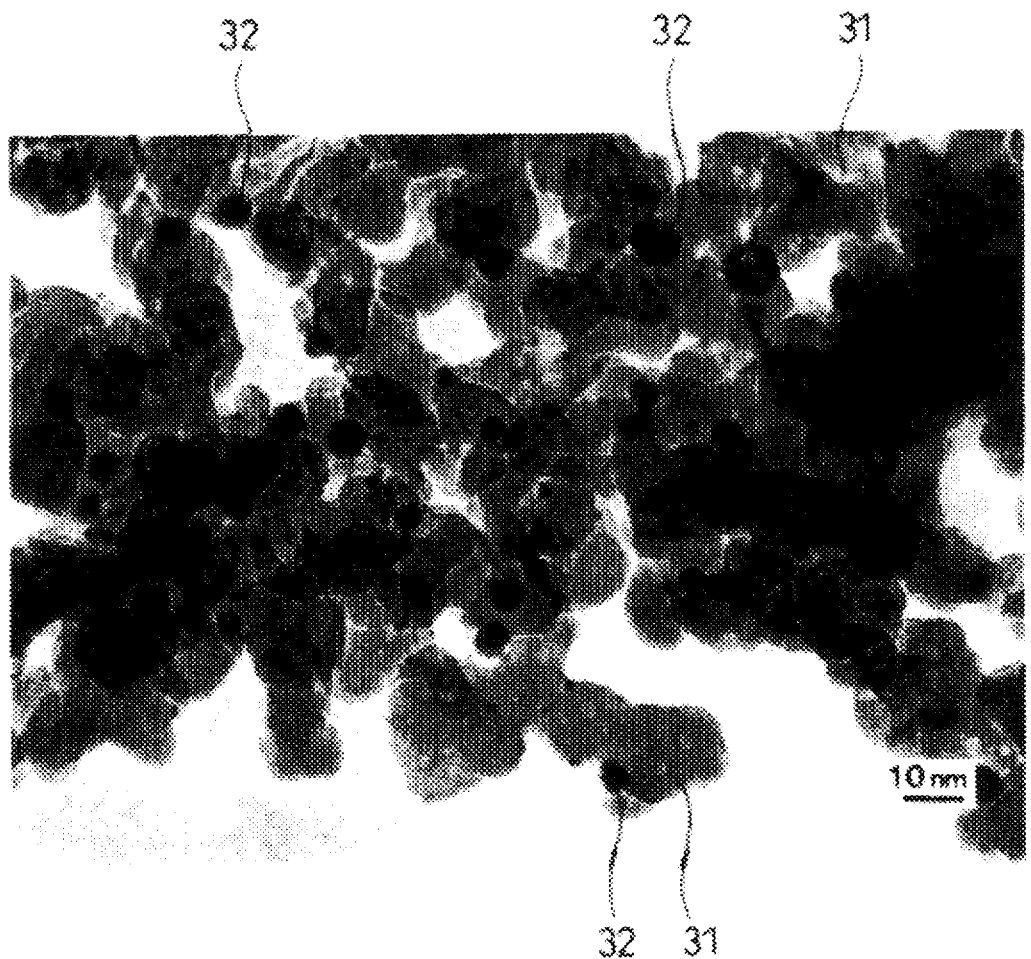
FIG. 3 is a transmission electron micrograph of a material having ultrafine gold particles deposited on titanium dioxide support obtained in Example 6.

In FIG. 3, 31 represents particles of titanium dioxide as the support and 32 ultrafine particles of gold deposited on the support.

Figure 4:
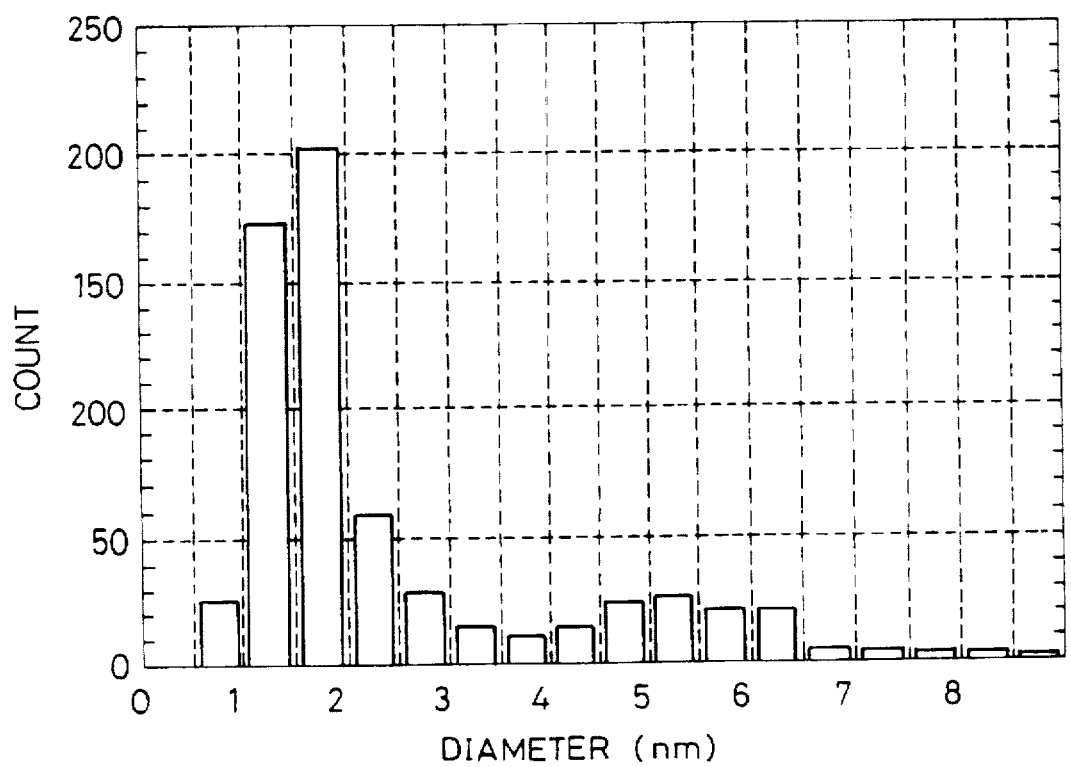
FIG. 4 is a graph showing the particle diameter distribution of ultrafine gold particles immobilized on the support measured from the electron micrograph shown in FIG. 3.

The distribution of particle diameters of the ultrafine gold particles deposited on the support was determined based on this electron micrograph. The results are shown in FIG. 4. It is clearly noted from the results that the average particle diameter was about 2 nm and the largest peak is in the neighborhood of 1–2 nm, indicating that these particles were finer than those obtained by the conventional liquid-phase methods.

What is claimed is:

1. A method for the production of a material having ultrafine gold particles whose particle diameters are not more than 250 angstroms immobilized thereon; consisting essentially of contacting an evaporated organic gold complex with at least one support which is a sulfide of at least one member selected from the group consisting of molybdenum, tungsten, iron, nickel, cobalt, platinum, vanadium, chromium, and manganese under a pressure of $1 \times 10^{-4}$–200 Torrs, thereby inducing adsorption of said evaporated organic gold complex on said support and then heating a product of said adsorption to a temperature in the range of 300°–500° C. to decompose an organic component in said organic gold complex and reduce a gold complex component.

2. A material having ultrafine gold particles immobilized thereon, consisting essentially of at least one support which is a sulfide of at least one member selected from the group consisting of molybdenum, tungsten, iron, nickel, cobalt, platinum, vanadium, chromium, and manganese, and ultrafine gold particles having a maximum particle diameter of 250 angstroms and deposited on said support prepared by the method of claim 1.

3. The material according to claim 2, wherein said support is at least one member selected from the group consisting of molybdenum sulfide, tungsten sulfide, iron sulfide, nickel sulfide, and cobalt sulfide.

4. The material according to claim 2, wherein the amount of said ultrafine gold particles is in the range of 0.01–30% by weight, based on the amount of said support.

5. The material according to claim 4, wherein the amount of said ultrafine gold particles is in the range of 0.01–10% by weight, based on the amount of said support.

6. The method according to claim 1, wherein said organic gold complex is at least one member selected from the group consisting of $(CH_3)_2Au(CH_3COCHCOCH_3)$, $(CH_3)_2Au(CF_3COCHCOCH_3)$, $(CH_3)_2Au(CF_3COCHCOCF_3)$, $(C_2H_5)_2Au(CH_3COCHCOCH_3)$, $(CH_3)_2Au(C_6H_5COCHCO-CF_3)$, $CH_3CH_2AuP(CH_3)_3$, and $CH_3AuP(CH_3)_3$.

7. The method according to claim 6, wherein said organic gold complex is one member selected from the group consisting of $(CH_3)_2Au(CH3COCHCOCH_3)$, $(CH_3)_2Au(CF_3COCHCOCF_3)$, and $(CH_3)_2Au(CF_3COOHCOCH_3)$.

8. The method according to claim 1, wherein said support has undergone a preliminary heat treatment.

9. The method according to claim 8, wherein said heat treatment is carried out in the atmosphere of at least one gas selected from the group consisting of oxidizing gases and reducing gases.

10. A flammable gas sensor element, consisting essentially of at least one support selected from the group consisting of sulfides of nickel, aluminum, manganese, silicon, titanium, vanadium, and chromium, and ultrafine gold particles having a maximum particle diameter of 250 angstroms and deposited on said support in an amount in the range of 0.01–30% by weight, based on the amount of said support, prepared by the method of claim 1.

11. The flammable gas sensor element according to claim 10, wherein the amount of said ultrafine gold particles is in the range of 0.01–10% by weight, based on the amount of said support.

* * * * *